US012083662B2

(12) United States Patent
Schamberger et al.

(10) Patent No.: US 12,083,662 B2
(45) Date of Patent: Sep. 10, 2024

(54) TOOL RECEPTACLE AND HAND-HELD POWER TOOL

(71) Applicant: Hilti Aktiengesellschaft, Schaan (LI)

(72) Inventors: Michael Schamberger, Scheuring (DE); Peter Gerold, Weilheim (DE)

(73) Assignee: Hilti Aktiengesellschaft, Schaan (LI)

( * ) Notice: Subject to any disclaimer, the term of this patent is extended or adjusted under 35 U.S.C. 154(b) by 926 days.

(21) Appl. No.: 17/256,684

(22) PCT Filed: Jul. 12, 2019

(86) PCT No.: PCT/EP2019/068824
§ 371 (c)(1),
(2) Date: Dec. 29, 2020

(87) PCT Pub. No.: WO2020/020667
PCT Pub. Date: Jan. 30, 2020

(65) Prior Publication Data

US 2021/0362316 A1 Nov. 25, 2021

(30) Foreign Application Priority Data

Jul. 23, 2018 (EP) .................................... 18184891

(51) Int. Cl.
*B25D 17/08* (2006.01)

(52) U.S. Cl.
CPC ...... *B25D 17/084* (2013.01); *B25D 2250/231* (2013.01); *Y10T 279/17068* (2015.01)

(58) Field of Classification Search
CPC .. B25D 17/082; B25D 17/084; B25D 17/088; B25D 2250/231; Y10T 279/17042; Y10T 279/17059; Y10T 279/17068
See application file for complete search history.

(56) References Cited

U.S. PATENT DOCUMENTS 2,278,931 A * 4/1942 Katterjohn ........... B25D 17/084 279/19.3
4,106,573 A * 8/1978 Bailey .................. B25D 17/084 279/19.3

(Continued)

FOREIGN PATENT DOCUMENTS

CN 102672684 A 9/2012
DE 838734 C 5/1952

(Continued)

OTHER PUBLICATIONS

International Search Report of PCT/EP2019/068824, dated Sep. 23, 2019.

*Primary Examiner* — Eric A. Gates
(74) *Attorney, Agent, or Firm* — Davidson Kappel LLC

(57) ABSTRACT

A tool receptacle for a hand-held power tool, in particular for a demolition hammer or chisel hammer, includes—a receptacle element for receiving a tool, and a locking element which for locking the tool in the tool receptacle is mounted so as to be eccentric and rotatable on the receptacle element, wherein the locking element with the aid of rotating the latter about the receptacle element is capable of being moved from an unlocked state in which the tool is retrievable from the receptacle element to a locked state in which the locking element encompasses the tool in a form-fitting manner, and vice versa.

17 Claims, 14 Drawing Sheets

(56) References Cited

U.S. PATENT DOCUMENTS

| | | | | |
|---|---|---|---|---|
| 4,206,820 | A * | 6/1980 | Bailey | B25D 17/084 279/19.3 |
| 2001/0030051 | A1 | 10/2001 | Hanke | |
| 2012/0223491 | A1 | 9/2012 | Hauptmann et al. | |
| 2014/0131959 | A1 | 5/2014 | Tussing et al. | |
| 2014/0346744 | A1 | 11/2014 | Herr et al. | |

FOREIGN PATENT DOCUMENTS

| | | | | |
|---|---|---|---|---|
| DE | 102011075858 | A1 | 11/2012 | |
| DE | 102011075860 | A1 | 11/2012 | |
| DE | 102012222639 | A1 * | 6/2014 | B25D 17/06 |
| FR | 2488179 | A1 * | 2/1982 | |
| GB | 1505907 | A | 4/1978 | |
| JP | S 6029432 | Y2 | 9/1985 | |

* cited by examiner

TOOL RECEPTACLE AND HAND-HELD POWER TOOL

FIELD OF THE INVENTION

The present invention relates to a tool receptacle for a hand-held power tool, and to a hand-held power tool having a tool receptacle of this type.

A demolition hammer or chisel hammer comprises a tool receptacle in which a tool such as, for example, a chisel, can be received. A tool receptacle of this type can have a locking installation for locking the tool in the tool receptacle, said locking installation being in the form of a folding mechanism. A folding mechanism of this type comprises a locking element which is capable of being folded perpendicularly to a central axis of the tool so as to block the tool in the tool receptacle and to release said tool again. A folding mechanism of this type is often stiff in the new state, and after some time of operation of the hand-held power tool often worn out such that said folding mechanism opens by itself and the tool can fall out of the tool receptacle.

SUMMARY OF THE INVENTION

It is an object of the present invention to provide an improved tool receptacle for a hand-held power tool.

Accordingly, a tool receptacle for a hand-held power tool, in particular for a demolition hammer or chisel hammer, is provided. The tool receptacle comprises a receptacle element for receiving a tool, and a locking element which for locking the tool in the tool receptacle is mounted so as to be eccentric and rotatable on the receptacle element, wherein the locking element with the aid of rotating the latter about the receptacle element is capable of being moved from an unlocked state in which the tool is retrievable from the receptacle element to a locked state in which the locking element encompasses the tool in a form-fitting manner, and vice versa.

On account of the locking element being pivoted eccentrically about the receptacle element, a folding mechanism which is prone to wear and has been described above can be dispensed with. This enhances the operational reliability of the tool receptacle.

The receptacle element preferably comprises a receptacle portion for receiving the tool. The receptacle portion can have a hexagonal internal geometry, for example, wherein the tool accordingly has a hexagonal external geometry. The tool receptacle is preferably mounted on the hand-held power tool in such a manner that the tool receptacle can perform a linear movement. The hand-held power tool can comprise an impact mechanism for moving the tool receptacle in a linear manner. The impact mechanism can be driven with the aid of an electric motor, for example. The tool can comprise an in particular encircling locking member which the locking element in the locked state encompasses or engages behind in a form-fitting manner. The unlocked state can also be referred to as the unlocked position, and the locked state can also be referred to as the unlocked position.

The locking element being mounted so as to be "eccentric" on the receptacle element is preferably to be understood such that a central axis of the receptacle element and a rotation axis or eccentric axis of the locking element are not congruent. This means that the locking element is preferably mounted so as to be out-of-center about or on the receptacle element. A form-fitting connection herein is to be understood to be a connection in which two connecting partners, presently the locking element and the tool, engage in one another or engage behind one another. This form-fitting connection is cancelled in the unlocked state such that the tool can be extracted from the receptacle element. Retrieving the tool from the receptacle element is not possible in the locked state, since the locking element encompasses the tool in a form-fitting manner, or engages behind said tool in a form-fitting manner. The locking element can also be referred to as a locking sleeve, or is a locking sleeve.

According to one embodiment, the locking element latches both in the unlocked state as well as in the locked state.

A latching installation can be provided to this end. The latching installation can comprise, for example, a spring-pretensioned ball or a spring-pretensioned bolt. For example, the locking element can be spring-pretensioned both in the direction of the unlocked state as well as in the direction of the locked state such that no intermediate position of the locking element is possible between the unlocked state and the locked state. This simplifies the tool receptacle in terms of handling.

According to one further embodiment, the tool receptacle comprises a central axis which is assigned to the receptacle element, and an eccentric axis which is assigned to the locking element and about which the locking element is rotatably mounted, wherein the eccentric axis is disposed so as to be parallel to and spaced apart from the central axis.

The receptacle element is preferably constructed so as to be rotationally symmetrical to the central axis. The eccentric axis is in particular disposed so as to be eccentric to the central axis. "Eccentric" in terms of the axes herein is to be understood that the eccentric axis is disposed so as to be parallel to and spaced apart from the central axis. This means that the eccentric axis is not congruent with the central axis.

According to one further embodiment, the locking element with the aid of rotating the latter about the eccentric axis is capable of being moved from the unlocked state to the locked state, and vice versa.

This means that the locking element in terms of the central axis of the receptacle element is in particular mounted so as to be out-of-center on or about the receptacle element. The locking element can be rotatably mounted directly on the receptacle element. The locking element can thus be rotatably mounted directly on the receptacle element. Alternatively, the locking element can be rotatably mounted indirectly on the receptacle element. In this case, a further element or component on which the locking element is rotatably mounted can be provided between the receptacle element and the locking element.

According to one further embodiment, the tool receptacle comprises an eccentric element which is disposed between the receptacle element and the locking element.

The eccentric element is optional. The eccentric element and the receptacle element can be two mutually separate components. Alternatively, the eccentric element can also be configured so as to be integral to the receptacle element or integral to the locking element. For example, the locking element is rotatably mounted on the eccentric element. A mounting by way of a friction bearing or a roller bearing can be provided to this end.

According to one further embodiment, the eccentric element has a cylindrical internal geometry in which the receptacle element is received and which is constructed so as to be rotationally symmetrical to the central axis, and a cylindrical external geometry which is disposed so as to be eccentric to the internal geometry and which is received in the locking element and is constructed so as to be rotationally symmetrical to the eccentric axis.

The aforementioned central axis is in particular the central axis of the receptacle element. The aforementioned eccentric axis is in particular the eccentric axis of the locking element. The eccentric axis can also be assigned to the eccentric element. The cylindrical internal geometry of the eccentric element can be a cylindrical internal face of a clearance or bore which penetrates the eccentric element. The eccentric element is preferably of cylindrical shape and comprises two end faces which are disposed so as to be mutually spaced apart and mutually parallel. The cylindrical external geometry of the eccentric element can be a cylindrical external face thereof. The locking element can be rotatably mounted on the cylindrical external geometry of the eccentric element. The internal geometry and the external geometry of the eccentric element being disposed so as to be mutually eccentric is to be understood such that said internal geometry and said external geometry do not have a common central axis. The external geometry can also be provided on the receptacle element. In this case, the eccentric element is optional.

According to one further embodiment, the receptacle element has a cylindrical external geometry which is received in the internal geometry of the eccentric element and which is constructed so as to be rotationally symmetrical to the central axis.

The cylindrical external geometry of the receptacle element can be a cylindrical external face thereof. The external geometry of the receptacle element preferably bears on the internal geometry of the eccentric element.

According to one further embodiment, the eccentric element is rotationally fixed in relation to the receptacle element, wherein the locking element is rotatable in relation to the eccentric element.

For example, the eccentric element is fixedly connected, in particular screwed, to the receptacle element. The locking element can be rotatably mounted on the eccentric element. A mounting, for example by way of a friction bearing or a roller bearing, can be provided to this end.

According to one further embodiment, the locking element has a cylindrical internal geometry in which the eccentric element is received, and a cylindrical external geometry which is disposed so as to be eccentric to the internal geometry.

The cylindrical internal geometry is preferably a cylindrical internal face of the locking element. The internal geometry of the locking element can bear on the external geometry of the eccentric element. The cylindrical external geometry of the locking element can be a cylindrical external face thereof. The internal geometry of the locking element is constructed so as to be rotationally symmetrical to a first central axis of the locking element, and the external geometry of the locking element is configured so as to be rotationally symmetrical to a second central axis of the locking element. The two central axes are disposed so as to be mutually parallel and mutually spaced apart. This means that the central axis of the internal geometry and the central axis of the external geometry are mutually positioned so as to be eccentric.

According to one further embodiment, the locking element has a holding collar which in the locked state encompasses the tool in a form-fitting manner.

The tool preferably comprises an encircling locking member, as has been mentioned above. The holding collar is specified for engaging behind or encompassing the locking member such that the tool in the locked state cannot be extracted from the receptacle element.

According to one further embodiment, the holding collar extends out of an end face of the locking element.

The locking element preferably comprises two end faces which are disposed so as to be mutually parallel and mutually spaced apart. The holding collar extends out of one of the two end faces.

According to one further embodiment, the holding collar has a holding portion which is disposed so as to be parallel to the end face and has a clearance, wherein the holding portion in the locked state encompasses the tool in a form-fitting manner, and wherein the tool in the locked state is guided through the clearance.

The holding collar preferably comprises a partially cylinder-shaped base portion which extends out of the end face and which with the aid of a connecting portion is connected so as to be integral to the holding portion, said connecting portion being in particular curved in a dome-shaped manner. The holding portion at least partially closes off the locking element at the front or end side. The clearance is preferably curved in the manner of an arc, in particular a circular arc.

According to one further embodiment, the locking element has a tubular geometry having a variable wall thickness.

The wall thickness in the region of the holding collar is preferably greater than in a region in which the holding collar is not provided. On account thereof, a lesser wall thickness can be provided in regions of the locking element that are not heavily stressed in mechanical terms. A significant saving in terms of weight in comparison to a consistent wall thickness can be achieved on account thereof.

Furthermore proposed is a hand-held power tool having a tool receptacle of this type.

The hand-held power tool is preferably a demolition hammer or chisel hammer. The hand-held power tool preferably comprises a drive, in particular an electric motor, which is specified for moving the tool receptacle in a reciprocating linear manner so as to activate the tool. The tool can be a chisel, for example.

According to one embodiment, the hand-held power tool comprises a tool which is received in the receptacle element and which has a locking member which the locking element in the locked state encompasses in a form-fitting manner so as to lock the tool in the tool receptacle.

The locking member preferably encircles the tool completely. Alternatively, the locking member can also encircle the tool only partially. The tool in the region of the locking member has an enlarged diameter. The locking member can be annular. The locking member can also be polygonal, in particular hexagonal.

BRIEF DESCRIPTION OF THE FIGURES

The following description explains the invention by means of exemplary embodiments and figures, in which.

Identical or functionally identical elements are indicated by the same reference symbols in the figures, unless stated otherwise.

DETAILED DESCRIPTION

Figure 1:
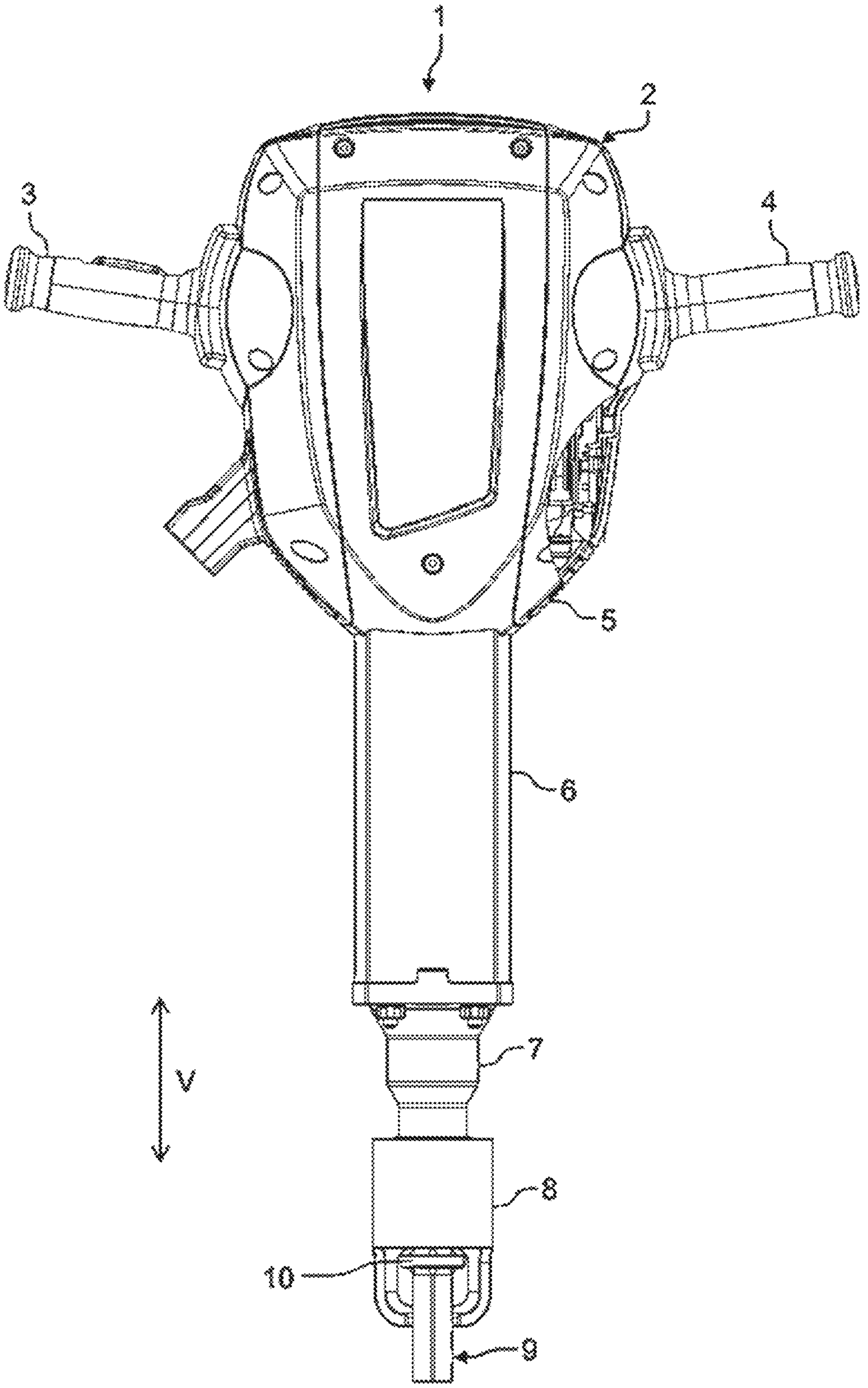
FIG. 1 shows a schematic view of an embodiment of a hand-held power tool.
Figure 2:
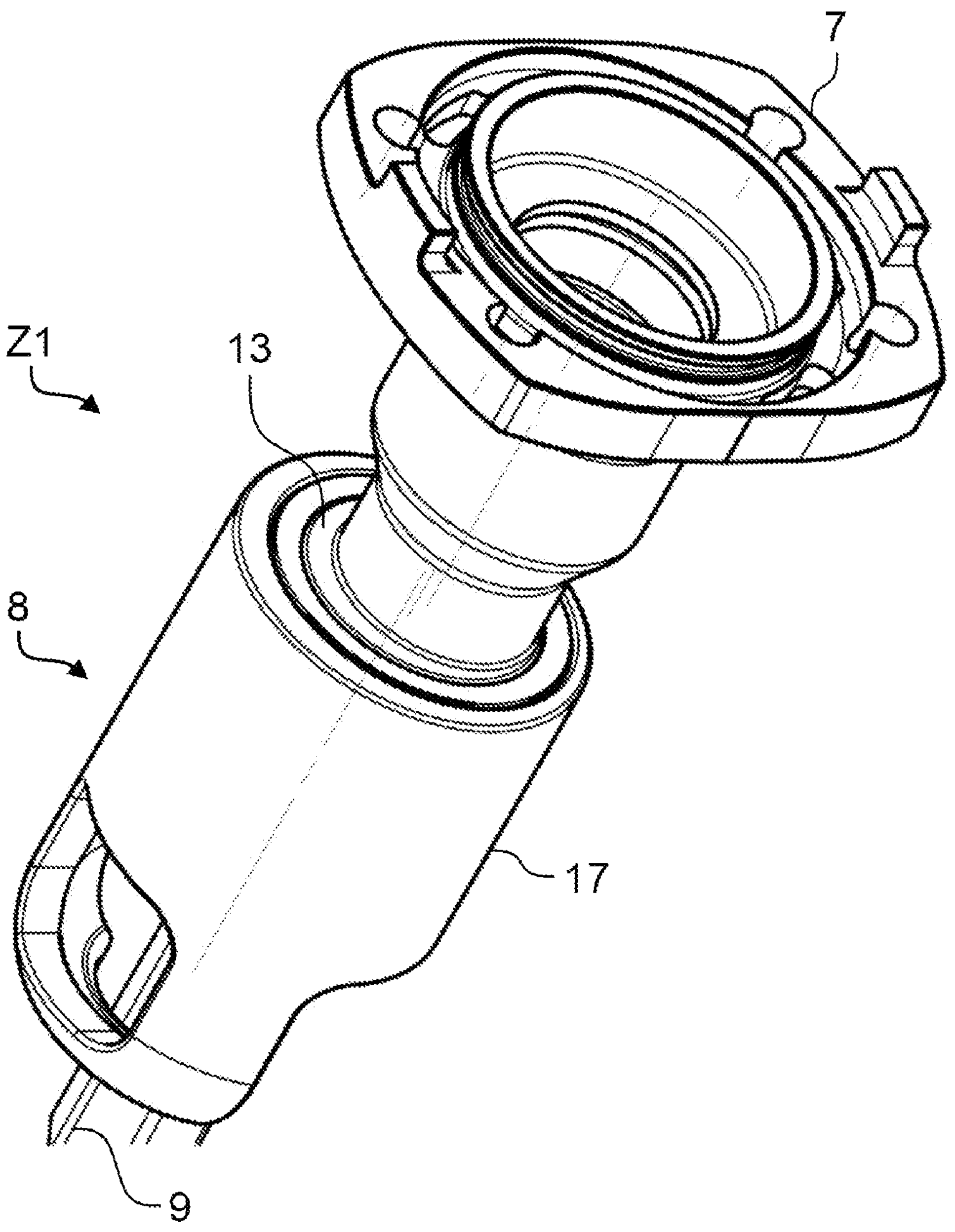
FIG. 2 shows a schematic perspective view of an embodiment of a tool receptacle for the hand-held power tool according to FIG. 1.

FIG. 1 shows a schematic view of an embodiment of a hand-held power tool 1. The hand-held power tool 1 is in particular a demolition hammer or chisel hammer. The hand-held power tool 1 comprises a machine body 2 on which in the orientation of FIG. 1 one handle 3, 4 is in each case provided on the left and the right. The handles 3, 4 are mounted on the machine body 2 so as to be decoupled in terms of vibrations. The machine body 2 comprises a plurality of housings 5 to 7. A drive of the hand-held power tool 1 can be received in a first housing 5. A second housing 6, which in the orientation of FIG. 1 is disposed on the lower side of the first housing 5, can be suitable for receiving an impact mechanism of the hand-held power tool 1. A third housing 7 is provided on the lower side of the second housing 6.

The third housing 7 can be screwed to the second housing 6, for example. A tool receptacle 8 can be mounted so as to be movable in a linear manner in or on the third housing 7. The tool receptacle 8 moves up and down in a vertical direction V in the operation of the hand-held power tool 1. The vertical direction V herein, in the orientation of FIG. 1, can be oriented from the top to the bottom. The vertical direction V can be congruent with a direction of gravity.

Figure 8:
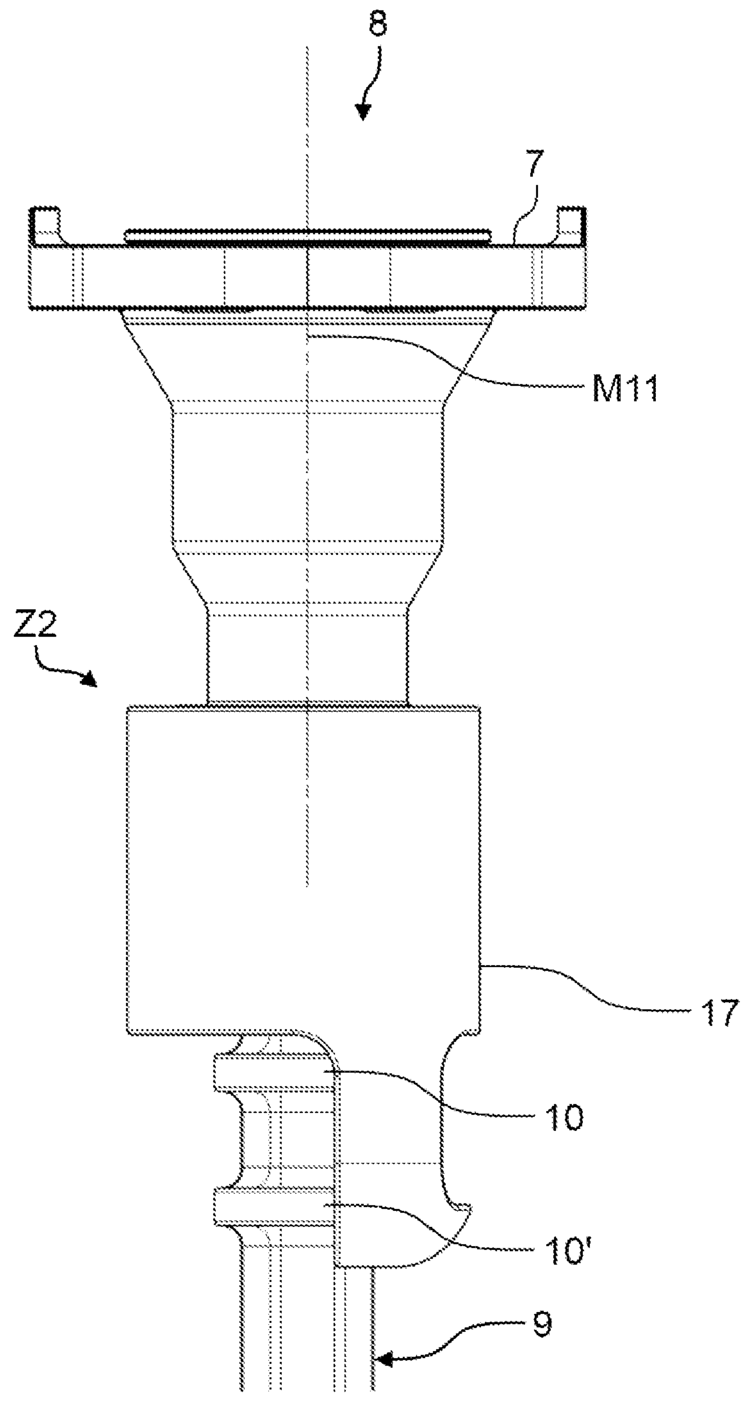
FIG. 8 shows a further schematic lateral view of the tool receptacle according to FIG. 2.
Figure 9:
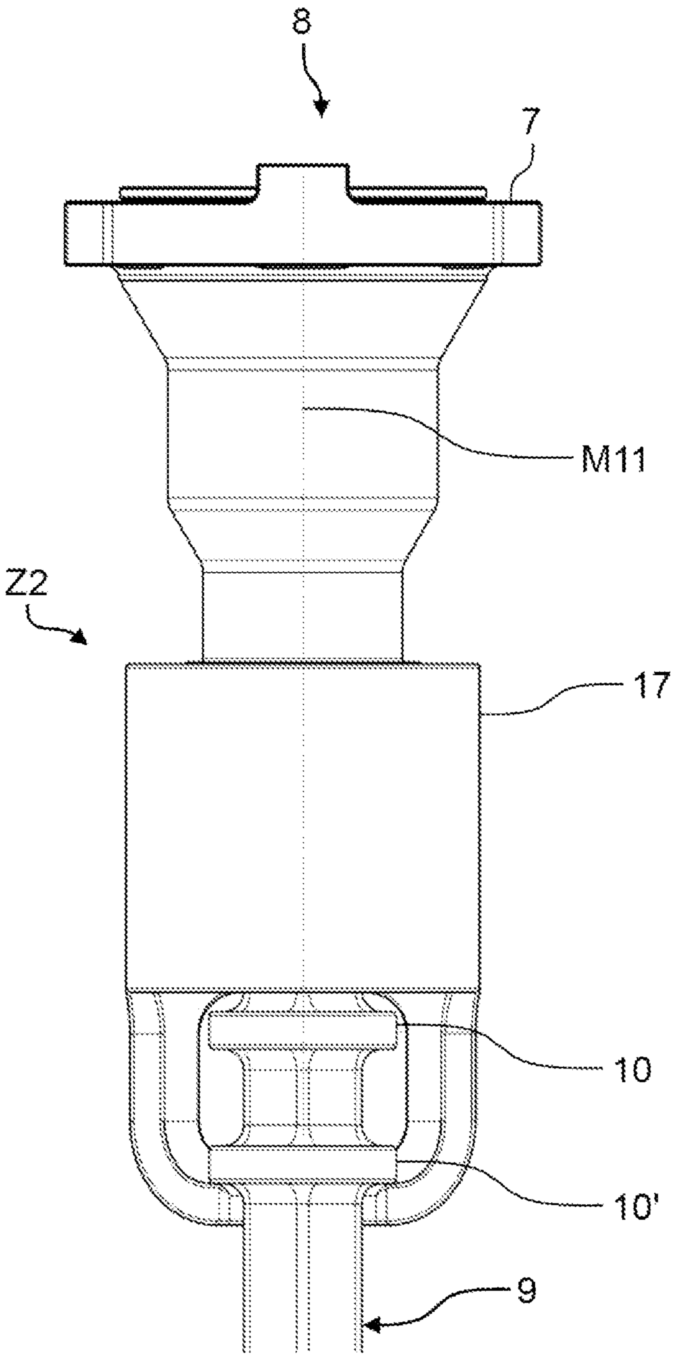
FIG. 9 shows a further schematic lateral view of the tool receptacle according to FIG. 2.
Figure 10:
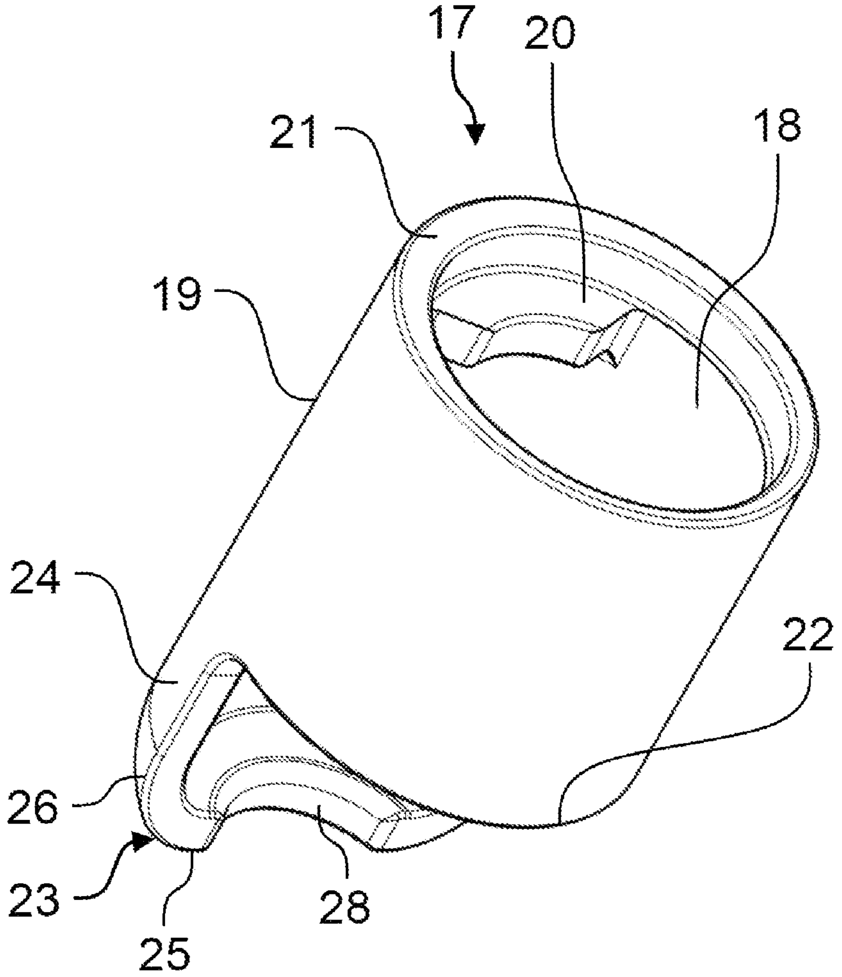
FIG. 10 shows a schematic perspective view of an embodiment of a locking element for the tool receptacle according to FIG. 2.
Figure 11:
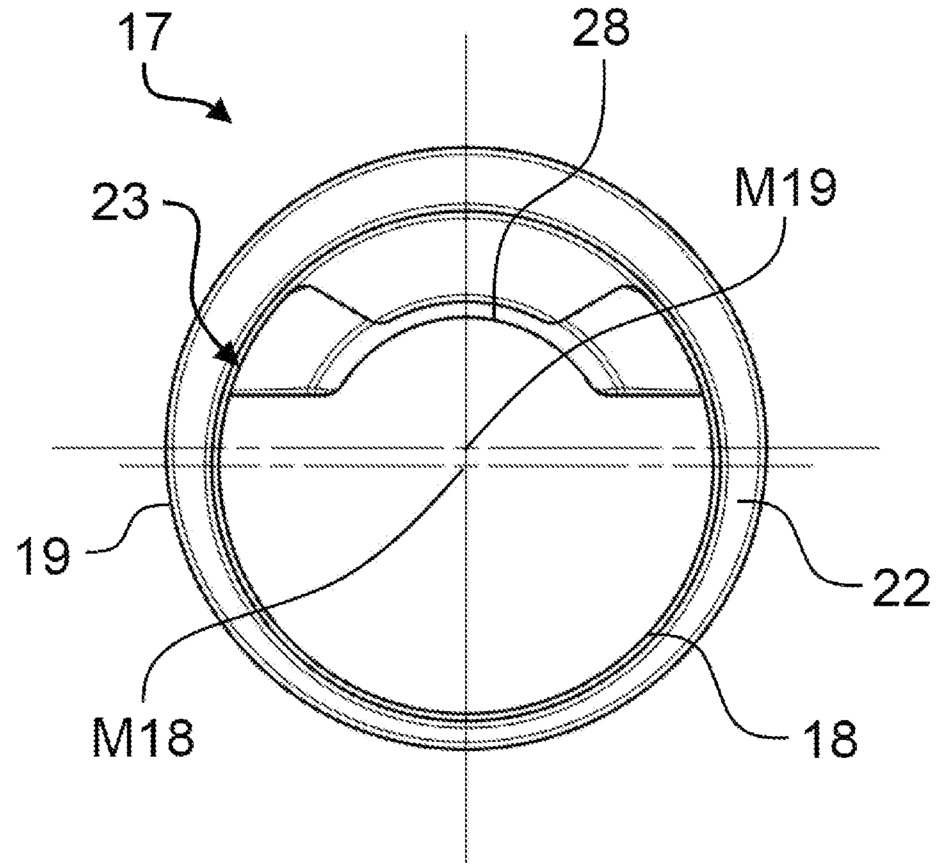
FIG. 11 shows a schematic plan view of the locking element according to FIG. 10.
Figure 12:
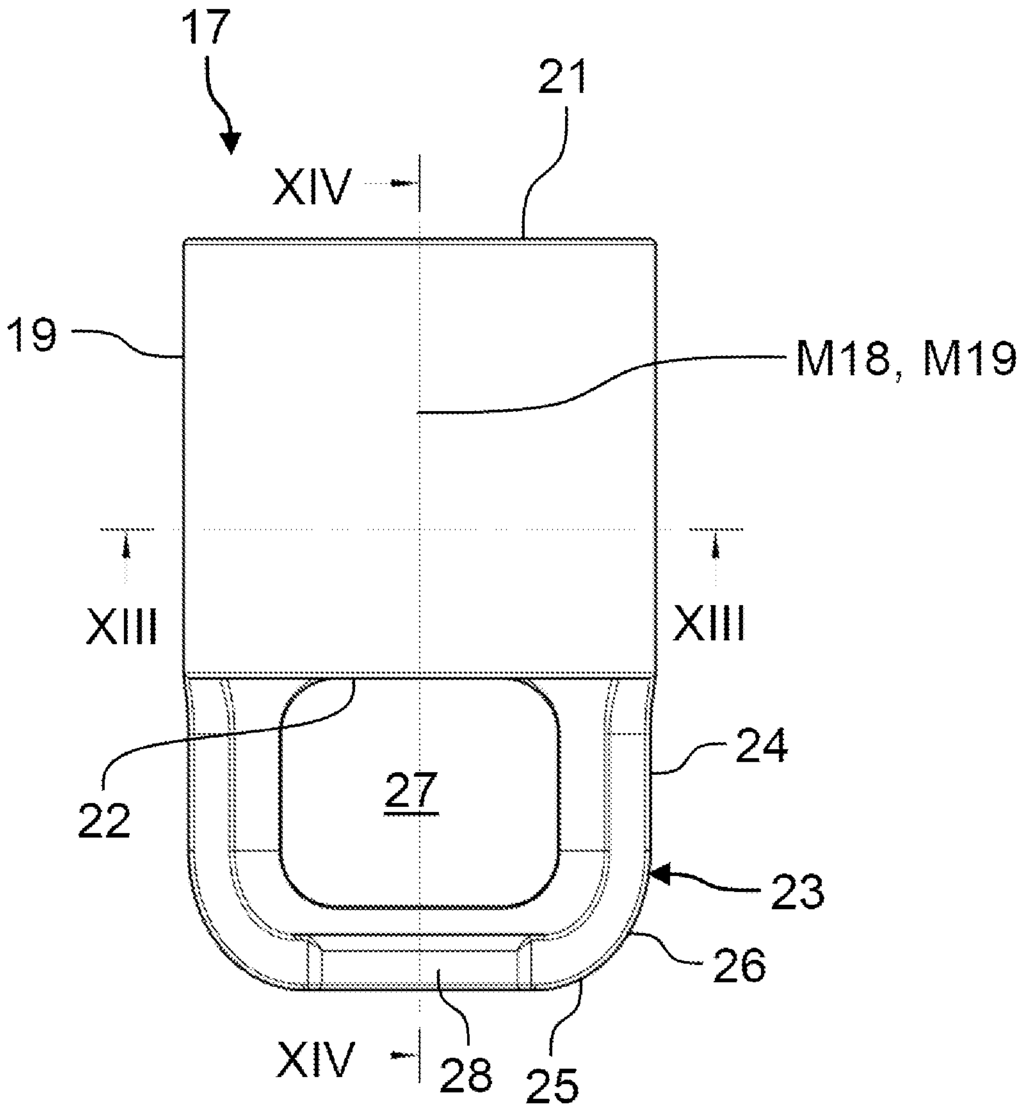
FIG. 12 shows a schematic lateral view of the locking element according to FIG. 10.

A tool 9 is received in the tool receptacle 8. The tool 9 can be a chisel, for example. The tool 9 can be hexagonal in the cross section. The tool 9 comprises a locking member 10 which encircles said tool 9, the function of said locking member 10 yet to be explained hereunder. The locking member 10 can be hexagonal in the cross section. However, the locking member 10 can also be circular. The locking member in FIGS. 8 and 9 at an operating point of the tool 9 is provided with the reference sign 10, and in a blank impact position of the tool 9 the locking member is provided with the reference sign 10'.

Figure 3:
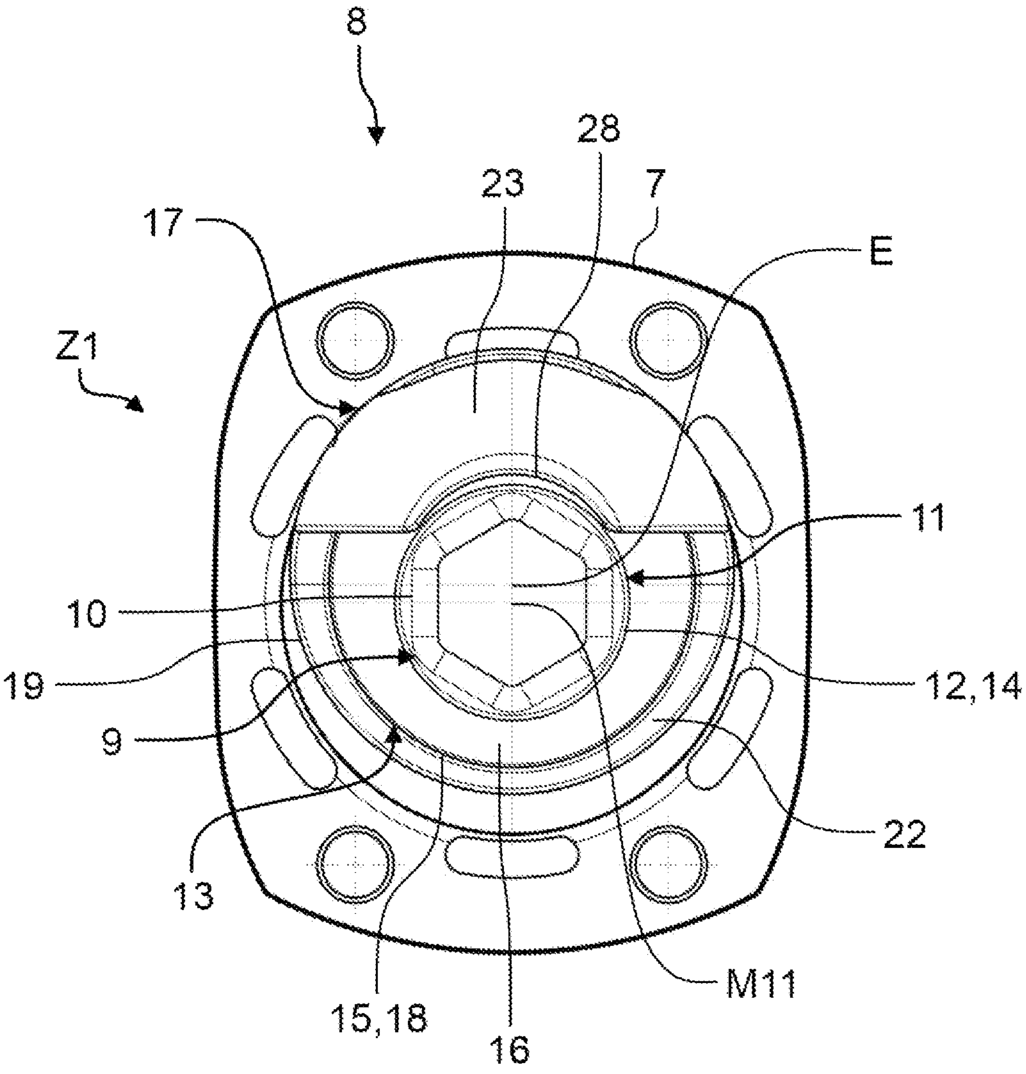
FIG. 3 shows a schematic plan view of the tool receptacle according to FIG. 2.
Figure 4:
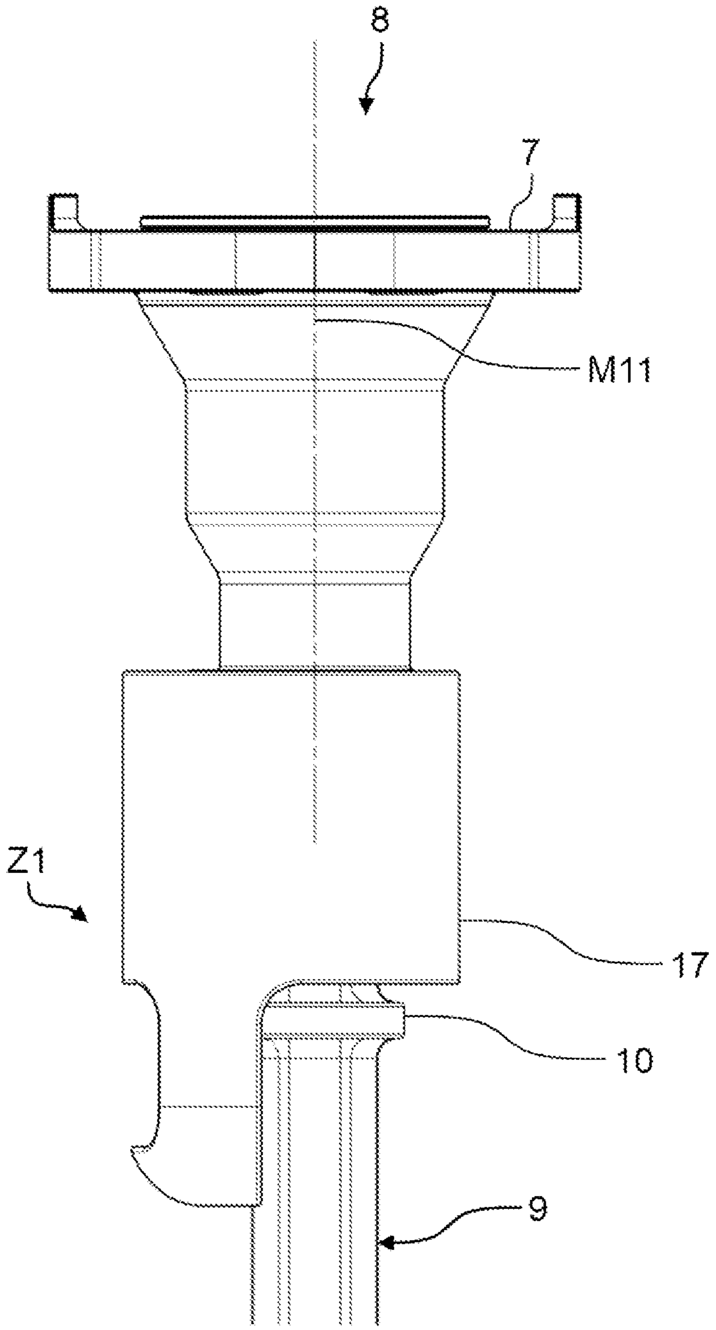
FIG. 4 shows a schematic lateral view of the tool receptacle according to FIG. 2.
Figure 5:
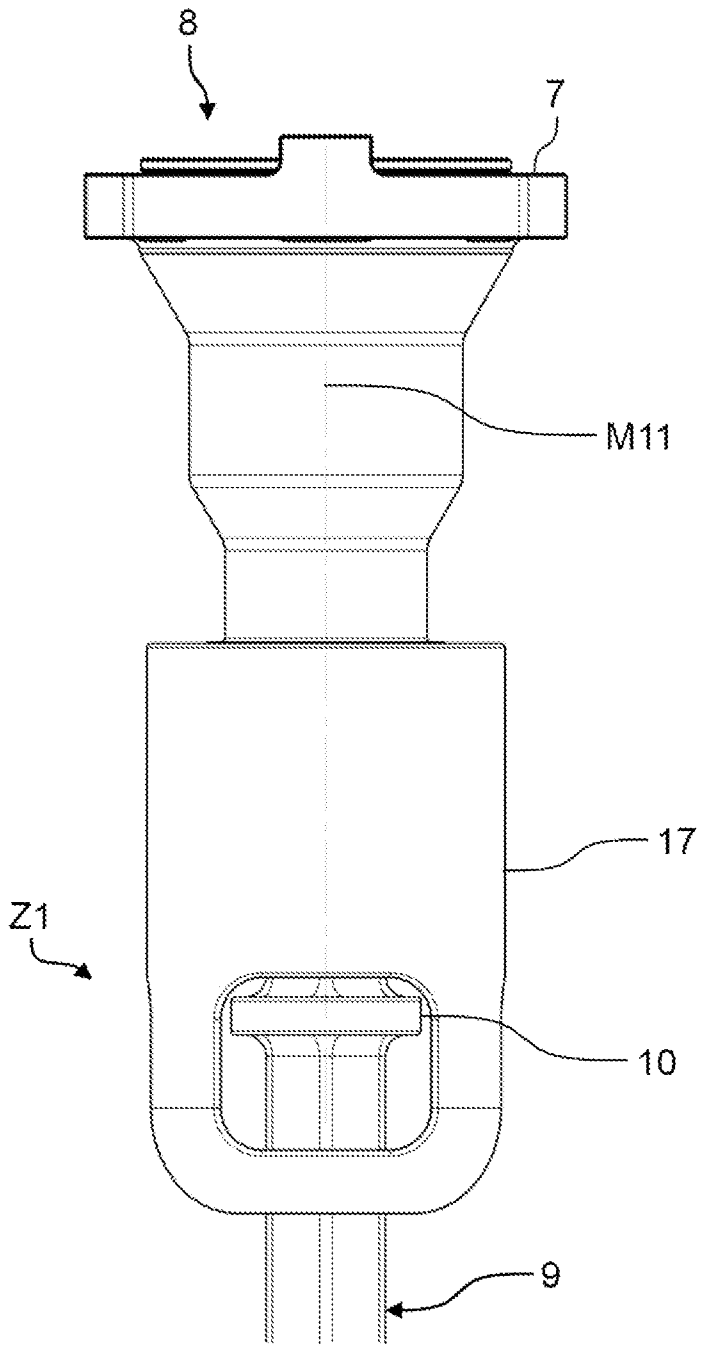
FIG. 5 shows a further schematic lateral view of the tool receptacle according to FIG. 2.
Figure 6:
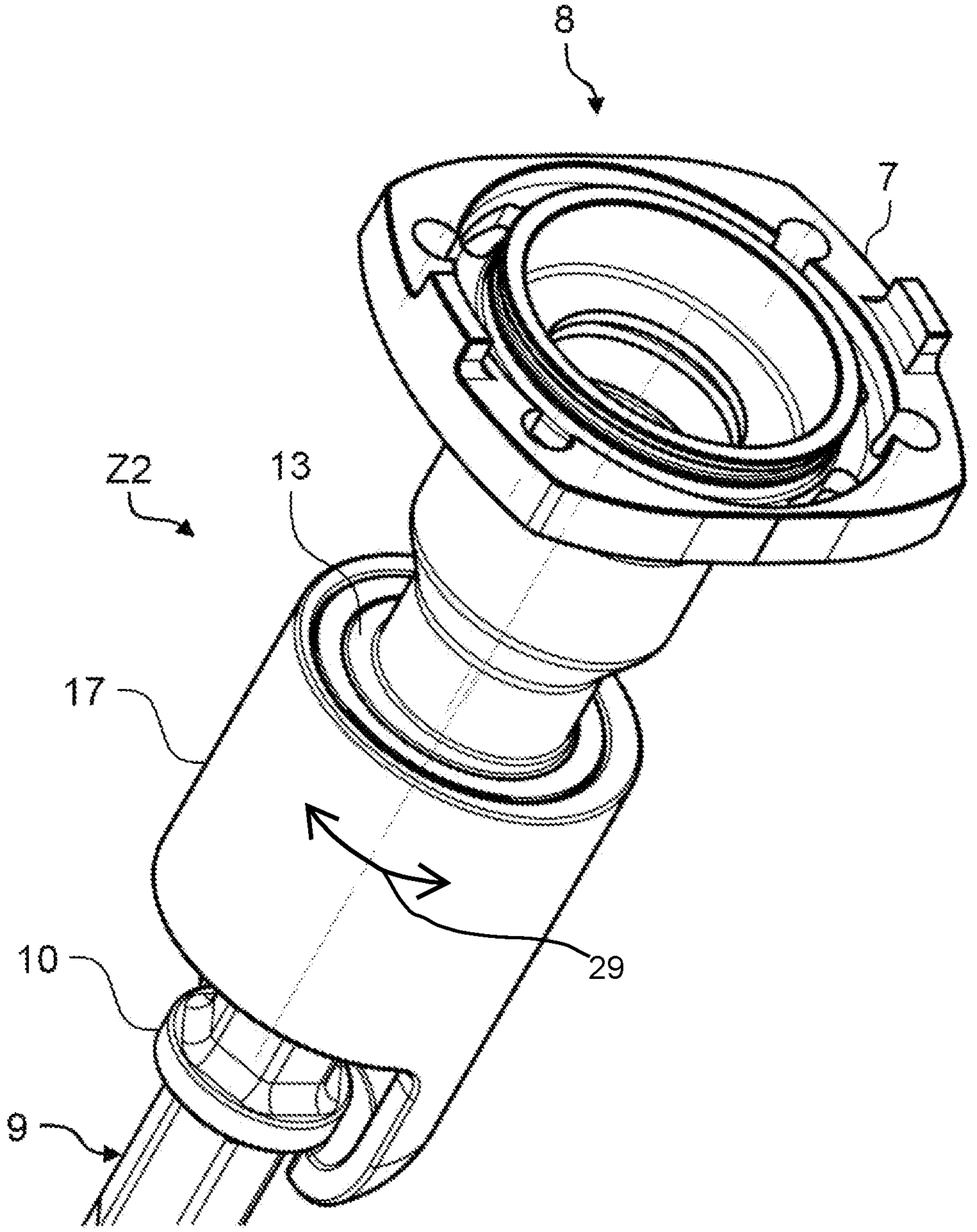
FIG. 6 shows a further schematic perspective view of the tool receptacle according to FIG. 2.
Figure 7:
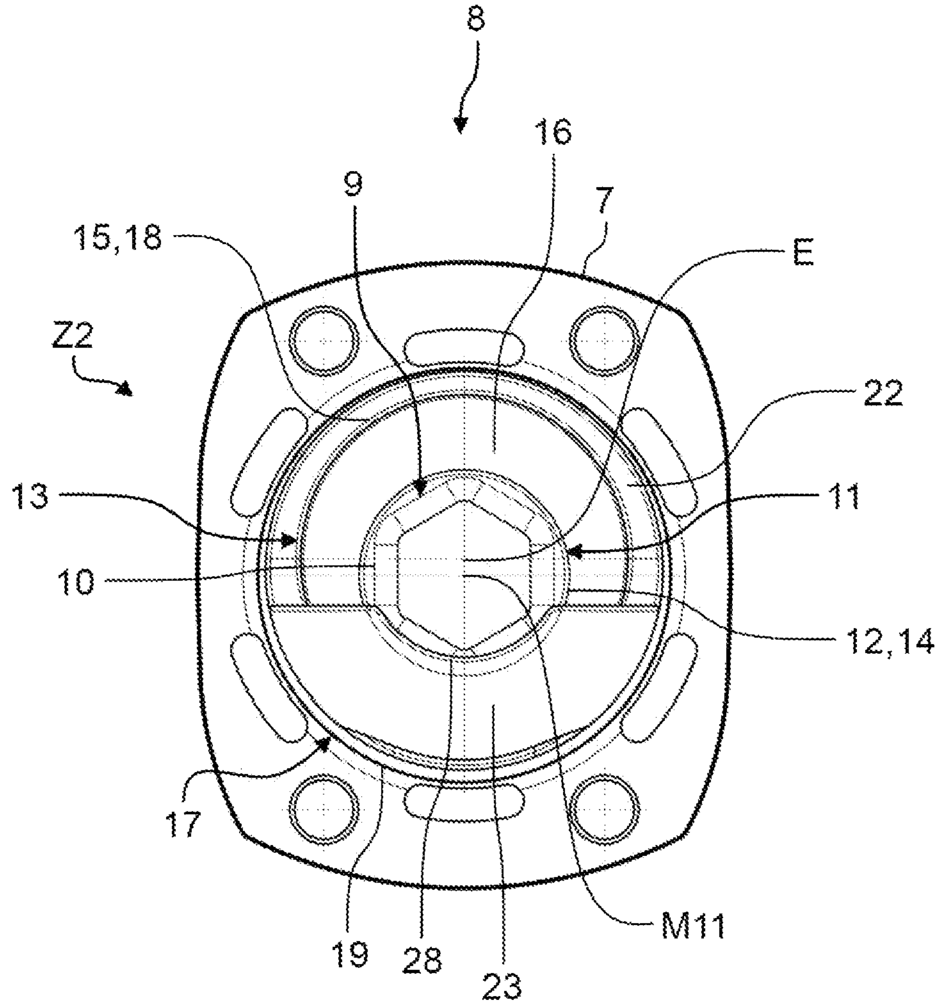
FIG. 7 shows a further schematic plan view of the tool receptacle according to FIG. 2.

As is shown in FIGS. 3 and 7, the tool receptacle 8 comprises a receptacle element 11 for receiving the tool 9. The receptacle element 11 is configured so as to be rotationally symmetrical to a symmetry or central axis M11. The receptacle element 11 comprises a cylindrical or cylinder-shaped external geometry 12 which is constructed so as to be rotationally symmetrical to the central axis M11. The external geometry 12 can be, for example, a cylinder-shaped external face of the receptacle element 11. The receptacle element 11 is mounted in the housing 7 so as to be displaceable along the vertical direction V. The receptacle element 11 comprises a receptacle region for receiving the tool 9. The receptacle region can be configured as a hexagonal socket into which the tool 9 is inserted, for example.

The receptacle element 11 is received in an eccentric element 13. The eccentric element 13 is preferably connected to the receptacle element 11 in a rotationally fixed manner. This means that the eccentric element 13 cannot rotate out of position in relation to the receptacle element 11. The eccentric element 13 can be configured so as to be integral to the receptacle element 11. This means that the receptacle element 11 and the eccentric element 13 can form a common, in particular materially integral, component.

The eccentric element 13 has a circular-cylindrical shape having a cylindrical or cylinder-shaped internal geometry 14 in which the receptacle element 11 is received. The internal geometry 14 can be, for example, a cylinder-shaped internal face of the eccentric element 13. For example, the internal geometry 14 is a breakthrough which penetrates the eccentric element 13 on the entire length of the latter. The external geometry 12 of the receptacle element 11 bears on the internal geometry 14 of the eccentric element 13. The internal geometry 14 herein is constructed so as to be rotationally symmetrical to the central axis M11.

The eccentric element 13 furthermore comprises a cylindrical or cylinder-shaped external geometry 15 which is constructed so as to be rotationally symmetrical to an eccentric axis E. The eccentric axis E is constructed so as to be eccentric to the central axis M11. "Eccentric" herein is to be understood that the eccentric axis E is disposed so as to be parallel to and spaced apart from the central axis M11. The eccentric element 13 furthermore comprises two end faces 16 which are disposed so as to be mutually parallel and mutually spaced apart, and which are oriented so as to be perpendicular to the internal geometry 14 as well as to the external geometry 15.

The tool receptacle 8 furthermore comprises a locking element 17 shown in FIGS. 2 to 14. The locking element 17 is sleeve-shaped and can therefore also be referred to as the locking sleeve. The locking element 17 comprises a cylindrical or cylinder-shaped internal geometry 18 in which the eccentric element 13 is received. The internal geometry 18 is a cylindrical internal face of the locking element 17, for example. For example, the internal geometry 18 of the locking element 17 can be rotatably mounted on the external geometry 15 of the eccentric element 13. The internal geometry 18 is configured so as to be rotationally symmetrical to a symmetry or central axis M18 (FIGS. 11 to 14) of the locking element 17. The central axis M18 can be congruent with the eccentric axis E.

The locking element 17 furthermore comprises a cylindrical or cylinder-shaped external geometry 19 which is disposed so as to be eccentric to the internal geometry 18. The external geometry 19 is, for example, a cylindrical external face of the locking element 17. The external geometry 19 is configured so as to be rotationally symmetrical to a symmetry or central axis M19 (FIGS. 11 to 14) of the locking element 17. The central axes M18, M19 are eccentrically disposed. This means that the central axis M19 is positioned so as to be parallel to the central axis M18 and spaced apart therefrom. This means in particular that the central axis M19 is not congruent with the central axis M18.

Figure 13:
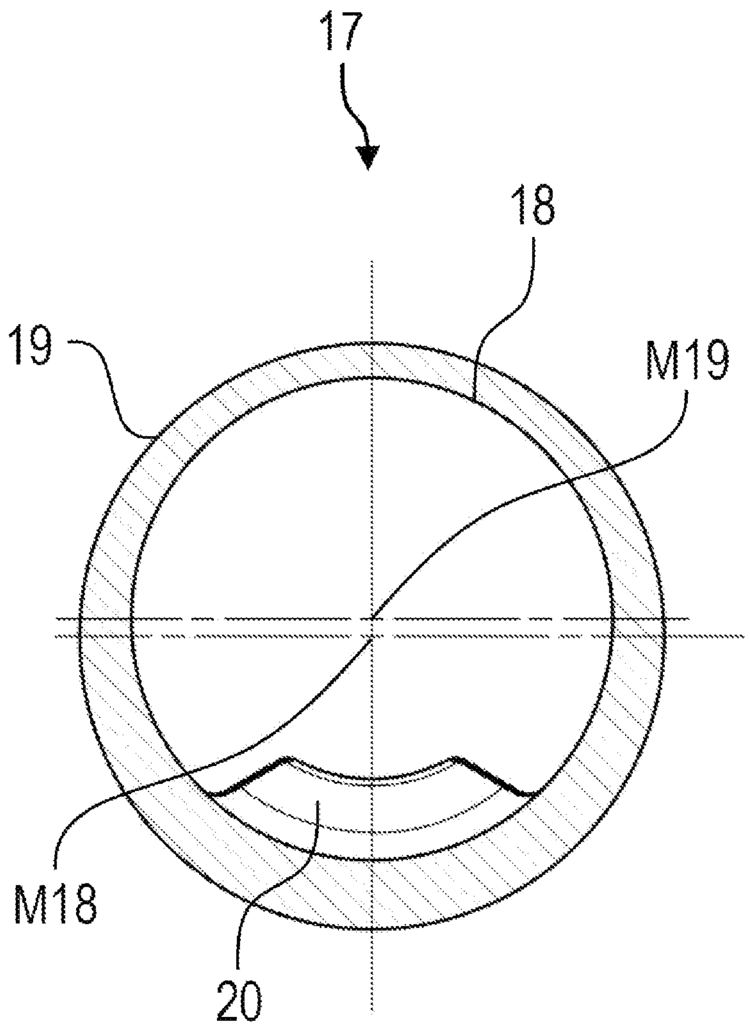
FIG. 13 shows a schematic sectional view of the locking element according to the section line XIII-XIII of FIG. 12.
Figure 14:
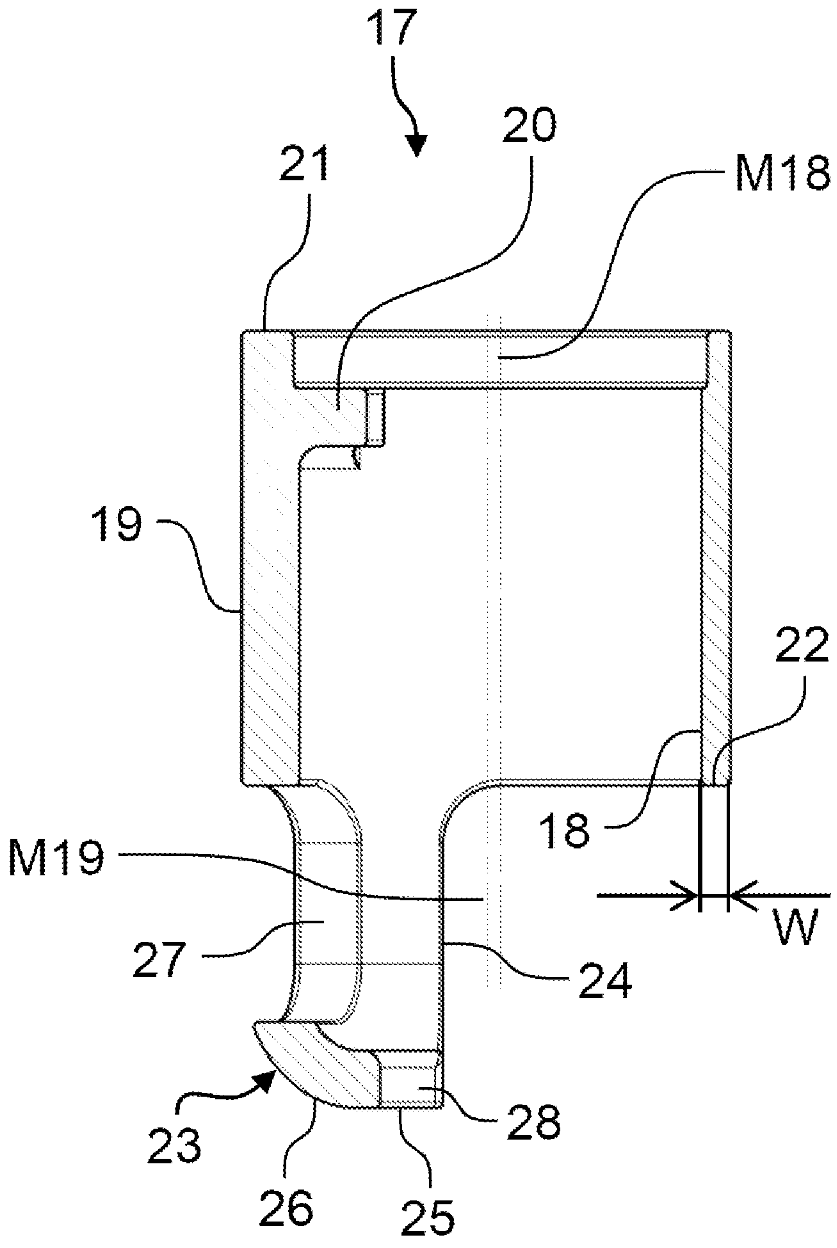
FIG. 14 shows a further schematic sectional view of the locking element according to the section line XIV-XIV of FIG. 12.

On account of the internal geometry 18 and the external geometry 19 being positioned so as to be mutually eccentric, it can be achieved, as is shown in FIGS. 13 and 14, that the locking element 17 in an encircling manner does not have a consistent but a variable wall thickness W. A significant saving in terms of weight in comparison to a consistent wall thickness can be achieved on account thereof.

The locking element 17 furthermore comprises a fastening shoulder 20 which extends radially toward the central axes M18, M19 and extends out of the internal geometry 18. For example, the fastening shoulder 20 can engage in the eccentric element 13 in such a manner that the locking element 17 is fastened so as to be captive and rotatable on the eccentric element 13.

The locking element 17 furthermore comprises two end faces 21, 22 which are disposed so as to be mutually parallel and mutually spaced apart. The end faces 21, 22 are oriented so as to be perpendicular to the central axes M18, M19. A holding collar 23 which is specified for encompassing the locking member 10 of the tool 9 in a form-fitting manner extends out of the end face 22. A form-fitting connection is created by at least two connecting partners engaging in or behind one another, presently the holding collar 23 and the locking member 10.

The holding collar 23 comprises a partially cylinder-shaped base portion 24 which extends out of the end face 22. "Partially cylinder-shaped" herein is to be understood that the base portion 24 is formed with the aid of part of a cylinder, in particular a part of a hollow cylinder. In particular, the base portion 24 is not circumferentially closed but open. The base portion 24 at the end side or front side is partially closed off by a holding portion 25. A connecting portion 26 which is curved in a spherical, in particular dome-shaped, manner, can be provided between the base portion 24 and the holding portion 25. A breakthrough or window 27 is furthermore provided in the base portion 24. The holding portion 25 furthermore comprises a clearance 28 which is curved in an arcuate manner and through which the tool 9 is guided. The clearance 28 can be constructed so as to be rotationally symmetrical to the central axis M18.

The functionality of the tool receptacle 8 will be explained hereunder by means of FIGS. 2 to 9. The locking element 17 can be moved from an unlocked state Z1, which is shown in FIGS. 2 to 5 and in which the tool 9 is capable of being extracted in the vertical direction V from the receptacle element 11 and in which the holding collar 23 does not encompass or engage behind the locking member 10 in a form-fitting manner, to a locked state Z2 which is shown in FIGS. 6 to 9 and in which the locking member 17 encompasses the tool 9, and in particular the locking member 10, in a form-fitting manner, and vice versa. To this end, the locking element 17 is rotated about the receptacle element 11, and in particular about the eccentric element 13, as is indicated with the aid of a double arrow 29 in FIG. 6. The locking element 17 is in particular rotated about the eccentric axis E.

The holding collar 23, by virtue of the eccentric mounting of the locking element 17, when moving the locking element 17 from the unlocked state Z1 (FIG. 3) to the locked state Z2 (FIG. 7) pivots across the locking member 10 of the tool 9 in such a manner that the tool 9 is locked in a form-fitting manner in the receptacle element 11. The holding collar 23 in the locked state Z2 thus encompasses or engages behind the locking member 10 in a form-fitting manner. Extracting the tool 9 in the vertical direction V from the tool receptacle 8 is thus not possible in the locked state Z2.

Conversely, the holding collar 23 when moving the locking element 17 from the locked state Z2 to the unlocked state Z1 pivots away from the tool 9 such that the latter can be extracted in the vertical direction V from the receptacle element 11 without the holding collar 23 contacting the locking member 10. As is shown in FIG. 3, it is possible by virtue of the eccentric mounting of the locking element 17 that the holding collar 23 in the unlocked state Z1 is disposed such that the locking member 10 can be guided out of the holding collar 23 by way of the clearance 28. Simple and rapid locking and unlocking of the tool 9 in the tool receptacle 8 is thus possible with the aid or the tool receptacle 8.

LIST OF REFERENCE SIGNS

1 Hand-held power tool
2 Machine body
3 Handle
4 Handle
5 Housing
6 Housing
7 Housing
8 Tool receptacle
9 Tool
10 Locking member
10' Locking member
11 Receptacle element
12 External geometry
13 Eccentric element
14 Internal geometry
15 External geometry
16 End face
17 Locking element
18 Internal geometry
19 External geometry
20 Fastening shoulder
21 End face
22 End face
23 Holding collar
24 Base portion
25 Holding portion
26 Connecting portion
27 Window
28 Recess
29 Double arrow
E Eccentric axis
M11 Central axis
M18 Central axis
M19 Central axis
V Vertical direction
W Wall thickness
Z1 Unlocked state
Z2 Locked state

What is claimed is:

1. A tool receptacle for a hand-held power tool, the tool receptacle comprising:

a receptacle element for receiving a tool;

a lock element for locking the tool in the tool receptacle, the lock element mounted so as to be eccentric and rotatable on the receptacle element, the lock element when rotated about the receptacle element being capable of being moved from an unlocked state, the tool being retrievable from the receptacle element in the unlocked state, to a locked state, the lock element encompassing the tool in a form-fitting manner in the locked state, and vice versa; wherein a central axis is assigned to the receptacle element, and an eccentric axis is assigned to the lock element, the lock element being rotatably mounted about the eccentric axis, wherein the eccentric axis is disposed so as to be parallel to and spaced apart from the central axis; and an eccentric element being disposed between the receptacle element and the lock element; wherein the lock element has a cylindrical internal geometry receiving the eccentric element, and a cylindrical external geometry disposed so as to be eccentric to the internal geometry.

2. The tool receptacle as recited in claim 1 wherein the lock element latches both in the unlocked state as well as in the locked state.

3. The tool receptacle as recited in claim 1 wherein the lock element when rotated about the eccentric axis is capable of being moved from the unlocked state to the locked state, and vice versa.

4. The tool receptacle as recited in claim 1 wherein the eccentric element has a cylindrical internal geometry receiving the receptacle element and constructed so as to be rotationally symmetrical to the central axis, and a cylindrical external geometry disposed so as to be eccentric to the internal geometry and received in the lock element and constructed so as to be rotationally symmetrical to the eccentric axis.

5. The tool receptacle as recited in claim 4 wherein the receptacle element has a cylindrical external geometry received in the internal geometry of the eccentric element and constructed so as to be rotationally symmetrical to the central axis.

6. The tool receptacle as recited in claim 1 wherein the eccentric element is rotationally fixed in relation to the receptacle element and wherein the lock element is rotatable in relation to the eccentric element.

7. The tool receptacle as recited in claim 1 wherein the lock element has a holding collar encompassing the tool in a form-fitting manner in the locked state.

8. The tool receptacle as recited in claim 7 wherein the holding collar extends out of an end face of the lock element.

9. The tool receptacle as recited in claim 8 wherein the holding collar has a holding portion disposed so as to be parallel to the end face and has a clearance, wherein the holding portion in the locked state encompasses the tool in a form-fitting manner, and wherein the tool in the locked state is guided through the clearance.

10. The tool receptacle as recited in claim 1 wherein the lock element has a tubular geometry having a variable wall thickness.

11. A hand-held power tool comprising the tool receptacle as recited in claim 1.

12. The hand-held power tool as recited in claim 11 further comprising the tool, the tool being received in the receptacle element, the tool having a lock member, the lock element in the locked state encompassing the lock member in a form-fitting manner so as to lock the tool in the tool receptacle.

13. A demolition hammer or chisel hammer comprising the hand-held power tool as recited in claim 12.

14. A tool receptacle for a hand-held power tool, the tool receptacle comprising:

a receptacle element for receiving a tool; and a lock element for locking the tool in the tool receptacle, the lock element mounted so as to be eccentric and rotatable on the receptacle element, the lock element when rotated about the receptacle element being capable of being moved from an unlocked state, the tool being retrievable from the receptacle element in the unlocked state, to a locked state, the lock element encompassing the tool in a form-fitting manner in the locked state, and vice versa;

wherein the lock element has a holding collar encompassing the tool in a form-fitting manner in the locked state.

15. The tool receptacle as recited in claim 14 wherein the holding collar extends out of an end face of the lock element.

16. The tool receptacle as recited in claim 15 wherein the holding collar has a holding portion disposed so as to be parallel to the end face and has a clearance, wherein the holding portion in the locked state encompasses the tool in a form-fitting manner, and wherein the tool in the locked state is guided through the clearance.

17. A tool receptacle for a hand-held power tool, the tool receptacle comprising:

a receptacle element for receiving a tool; and a lock element for locking the tool in the tool receptacle, the lock element mounted so as to be eccentric and rotatable on the receptacle element, the lock element when rotated about the receptacle element being capable of being moved from an unlocked state, the tool being retrievable from the receptacle element in the unlocked state, to a locked state, the lock element encompassing the tool in a form-fitting manner in the locked state, and vice versa; wherein a central axis is assigned to the receptacle element, and an eccentric axis is assigned to the lock element, the lock element being rotatably mounted about the eccentric axis, wherein the eccentric axis is disposed so as to be parallel to and spaced apart from the central axis; and an eccentric element being disposed between the receptacle element and the lock element; wherein the eccentric element is rotationally fixed in relation to the receptacle element and wherein the lock element is rotatable in relation to the eccentric element.

* * * * *